United States Patent
Wang et al.

(10) Patent No.: US 6,562,431 B2
(45) Date of Patent: May 13, 2003

(54) PACKAGED SET OF LUMINOUS DISK WITH DIY SURFACE AND METHOD OF ITS USE

(75) Inventors: Shaw-Jong Wang, Hsinchu (TW); Chien-Hua Wu, Miao Li Hsien (TW); Chih-Ping Liang, Hsinchu Hsien (TW)

(73) Assignee: Ritek Corporation, Hsinchu Hsien (TW)

( * ) Notice: Subject to any disclaimer, the term of this patent is extended or adjusted under 35 U.S.C. 154(b) by 124 days.

(21) Appl. No.: 09/905,008

(22) Filed: Jul. 13, 2001

(65) Prior Publication Data

US 2003/0012932 A1 Jan. 16, 2003

(51) Int. Cl.$^7$ .................................................. B32B 3/02

(52) U.S. Cl. .................... 428/64.1; 428/64.4; 428/64.8; 428/42.3

(58) Field of Search ................................ 428/64.1, 64.4, 428/64.8, 690, 913, 40.1, 42.1, 42.3; 430/270.14, 495.1, 945

(56) References Cited

U.S. PATENT DOCUMENTS

| | | | | |
|---|---|---|---|---|
| 5,732,979 A | * | 3/1998 | Finke | 283/81 |
| 6,168,841 B1 | * | 1/2001 | Chen | 428/40.1 |
| 6,265,043 B1 | * | 7/2001 | Vinyard | 428/40.1 |
| 2002/0068141 A1 | * | 6/2002 | Pieper | 428/42.3 |

* cited by examiner

Primary Examiner—Elizabeth Mulvaney

(57) ABSTRACT

The present invention discloses a packaged set of luminous disks with DIY surface and a method of its use. The invention is designed for providing consumers an alternative to design the surface of the disk at their will. The packaged set of the present invention basically contains at least one luminous disks and at least one transparent stickers; the luminous disk has a disk lamination and a light-emitting lamination, the transparent stickers has cutting lines defined some specific shapes for users to easily detach from the mother sheet. After designing and printing out the desired patterns on the transparent stickers, the user detaches the transparent stickers and then stick them onto the luminous surface of the luminous disk, a special home-made disk is thus obtained.

8 Claims, 3 Drawing Sheets

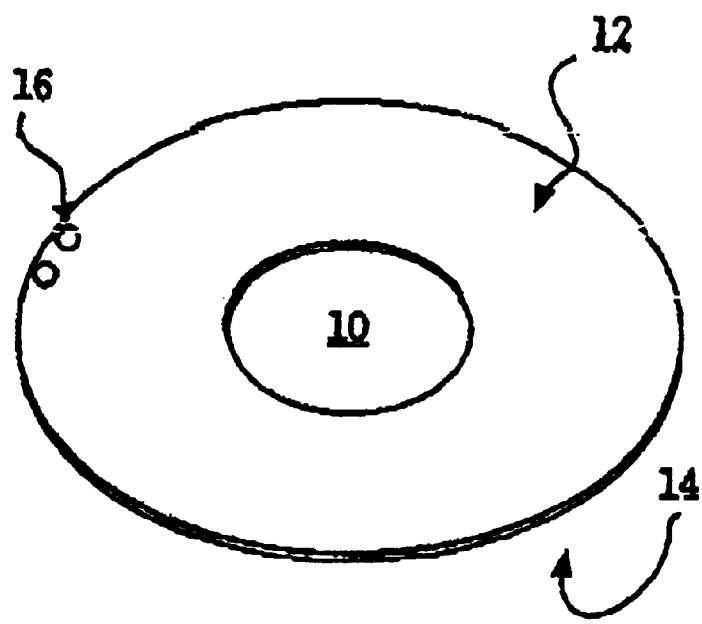
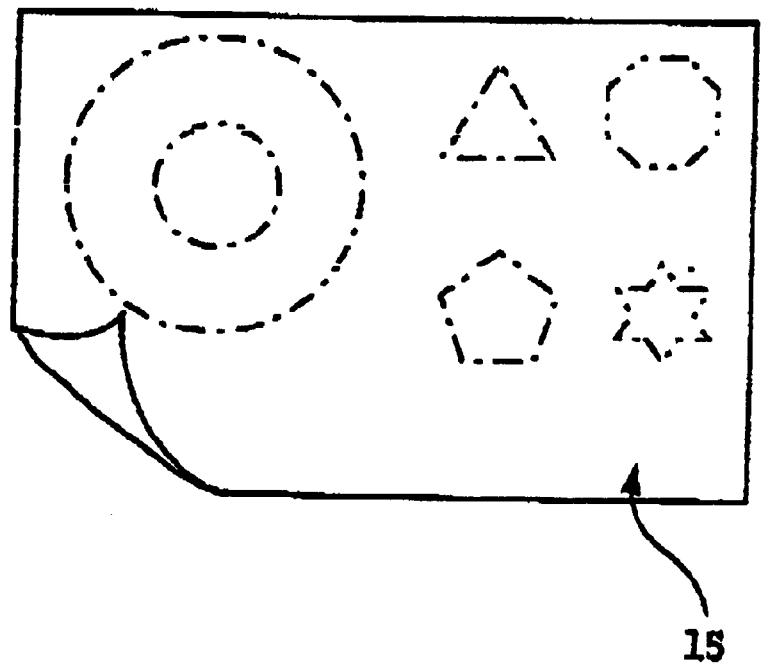
Fig. 1

```
┌─────────────────────────────┐
│ printing desired patterns on a │
│    provided blank sheet of     │
│   transparent sticker with     │
│        precut shape            │
└─────────────────────────────┘
                │
                ▼
┌─────────────────────────────┐
│ detaching the sticker from the │
│        original sheet          │
└─────────────────────────────┘
                │
                ▼
┌─────────────────────────────┐
│ plastering a luminous side of  │
│   a luminous disk with the     │
│       patterned sticker        │
└─────────────────────────────┘
```

Fig. 2

PACKAGED SET OF LUMINOUS DISK WITH DIY SURFACE AND METHOD OF ITS USE

CROSS REFERENCE TO RELATED APPLICATION

U.S. application Ser. No. 09/399,326 entitled "Luminous Disk", applied for by the inventor of the present invention, discloses a luminous disk having a disk lamination and a light-emitting lamination. The configuration of the disk makes it possess a higher application value due to the light-emitting nature. However, the invention emphasizes its particular structure, and is not able to let users be involved in the design and the following outcome of the disk.

BACKGROUND OF THE INVENTION

1. Field of the Invention

The present invention relates generally to a package of a luminous disk with a DIY surface. More specifically, the invention relates to a luminous disk packaged set having a luminous disk with a blank surface and at least one transparent sticker, which enables users to freely design their favorite graphics on the disk.

2. Description of Prior Art

Most of currently used disks are regular disks, either disks already have data and with surfaces' design relative to the content of the data, such as general music compact disk or video compact disk, or blank disks with non-designed surfaces for users to store their own information, and if users want, to make a corresponding disk surface. No matter what form of disk it is, it stays in a primitive data storage formation without any additional function.

There is another form of disk available in market that has hot induction surface, the hot induction surface enables users to design disk surface at their own will. However, a special appliance must be used for showing the desired image on the hot induction surface, which means that the user has to bring their design back to the original store where they purchased the disk to complete the whole image-showing process. It is not only time-consuming but also inconvenient. Besides, except the hot induction surface laminated on the printed side of the disk, the disk possesses no other additional variation.

As a result, there is a need in the marketplace for providing a set of necessities that employer consumers an alternative to make their own disk production.

SUMMARY OF THE INVENTION

An object of the present invention is to provide a packaged set of a luminous disk that enables users to design disk appearances at their own will.

Another object of the present invention is to provide a luminous disk with a DIY surface, which makes the product more popular and amiable, and easier to access.

Yet another object of the present invention is to provide a packaged set of a luminous disk with a DIY surface for users to have a chance to create their own disk and enjoy the pleasure of doing so.

To achieve the above, the packaged set of luminous disk with a DIY surface of the present invention comprises:

at least one luminous disk having a disk lamination and a light-emitting lamination provided with a plurality of conductive terminals; and at least one blank transparent stickers for printing patterns and sticking on a luminous surface of the luminous disk;

whereby users can freely print any pattern on the transparent stickers, and then stick them on the top of the luminous surface of the luminous disk.

Provided a packaged set according to the present invention, a user is now able to produce their own disk, either a disk contains fixed data just for users to design their favorite cover, a content-free disc for users to fully create a CD, VCD, or DVD with their own content as well as cover, or even a blank disk lamination made of plastic with a light-emitting lamination on it for users to freely design for decorating or amusement.

The present invention also provides a method for making use of the packaged set as follows:

(1) printing desired patterns on a blank sheet of transparent sticker with cutting lines on it, which is provided by the packaged set of a luminous disk;

(2) detaching the patterned sticker from the sheet along the cutting lines; and (3) plastering a luminous surface of the luminous disk with the patterned sticker.

With the method provided above, consumers can easily utilize the components provided inside the packaged set to create their own disk cover.

BRIEF DESCRIPTION OF THE DRAWINGS

The present invention will be described in accordance with the accompanying figures, wherein:

FIG. 1 is a packaged set of an exemplary embodiment in accordance with the present invention;

FIG. 2 is a block diagram of an operation instruction of the package set of luminous disk with DIY surface in accordance of the present invention;

DETAILED DESCRIPTION OF THE PREFERRED EMBODIMENT

Figure 3:
FIG. 3 is a plan view of a finished disk made from the components of the set and the method of the present invention.

Fig. 1 is a packaged set of an exemplary embodiment in accordance with the present invention. The packaged set contains one or several luminous disks 10 having a light-emitting lamination 12 and a disk lamination 14 and a plurality of transparent sticker sheets 15 with cutting lines on it. The luminous disk of the present invention is not limited to any kind of luminous disk with any specific structure or manufactured process, as long as a disk is equipped with a disk lamination and a light-emitting lamination for emitting light can be utilized in the invention, the disk lamination can be a disk having readable surface for recording data, such as CD-R, CD-RW, VCD, DVD-R, DVD-RW and so on, or a blank disk-shaped lamination made of plastic. The transparent sticker sheets in the present embodiment are of regular A4 size with several different cutting shapes for consumers to conveniently detach them. The stickers are initially blank for consumers to easily print desired patterns on it with computer appliance and printer, and then detach the stickers from the sheet to stick on the luminous surface of the luminous disk to decorate it. Due to the light emitting nature of the luminous surface, the patterns on the transparent sticker which are already been stuck on the top of the luminous layer can be shown vividly. The material of the transparent sticker sheets can be any transparency film with one sticky side. Moreover, the set can further contains a plug to electrically connect the conductive terminals 16 of the luminous to external power supply.

In the embodiment, there are many possible variations. For example, the luminous disk itself can be designed to be multi-colored light emitting, multi-sectional flash, or other light-emitting forms by means of an inverter set; the materials used for the luminous surface of the luminous disk to emit light can be any materials that spontaneously emit light when receive an exterior power supply, such as electroluminescent plate, organic lighting emitting diode (OLED), or polymer lighting emitting diode (PLED). The stickers are not necessarily to be totally blank; if the disk already contains data, the stickers can be preprinted with corresponding patterns so that users can choose to use the preprinted patterns or use other blank stickers to design their own patterns on the disk.

The present invention also discloses a method of making use of the package of luminous disk with DIY surface; the method mainly contains three steps shown in FIG. 2. The following is a detail description of the method: (a) printing desired patterns on a provided blank sheet of transparent sticker with cutting lines. Because the blank sheet provided in the package is a transparency film suitable for general printer, users can easily design their favorite patterns on a computer with any compatible software, and then print them onto the transparent sticker; in other case, users can even directly draw patterns on the transparent sticker; (b) detaching the patterned sticker from the original sheet along the cutting lines; and (c) plastering a luminous surface of a luminous disk with the patterned sticker; due to the DIY nature of the invention, users can freely stick the sticker at any position of the luminous side, or even overlap several stickers at the same position to show some specific effect they would like to achieve; furthermore, the shape of the disk is not resisted to any shapes, it can be of any regular or irregular shapes. Provided the packaged set with the method, a unique finished disk can be obtained. Moreover, if the consumer wants to change the appearance of the disk, just tear the last sticker off the disk and put a new one on.

Figure 4:
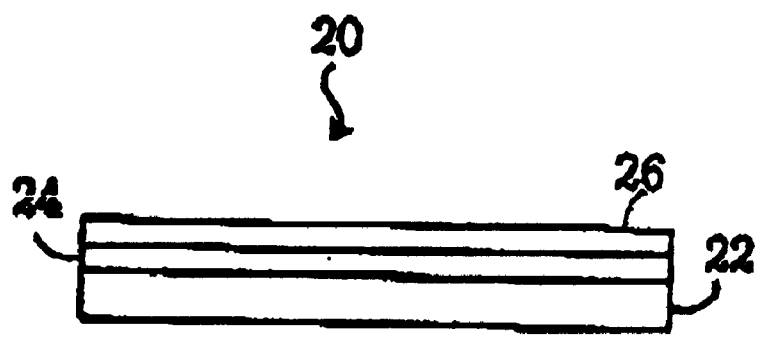
FIG. 4 is a side view of a finished disk in accordance with the present invention.

FIG. 3 is a plan view of a finished disk made from the components of the set and utilizing method of the present invention, and FIG. 4 is a side view of a finished disk in accordance of the present invention. The finished disk 20 already contains some arbitrarily designed patterns on it. There are three layers in the finished disk 20, a disk lamination 22 with its readable side facing downward, an electroluminescent layer of on the print side of the disk 22, and a pattern layer 26 on the top of the electroluminescent layer. As long as the disk is well preserved, the surface/design of the disk can be constantly changed.

Although the present invention has been disclosed in terms of preferred embodiments, the disclosure is not intended to limit the present invention. The present invention still can be modified or varied by persons skilled in the art without departing firm the scope and spirit of the present invention determined by the claims below.

What is claimed is:

1. A packaged set of luminous disks with a DIY surface, comprising:
    at least one luminous disks, each has a disk lamination and a light-emitting lamination provided with a plurality of conductive terminals; and
    at least one blank transparent stickers for printing patterns and sticking on a luminous surface of the luminous disk;
    whereby users can freely print any pattern on the transparent stickers, and then stick them on the top of the luminous surface of the luminous disk.

2. The packaged set according to claim 1, wherein each of the blank sheets has a plurality of cutting lines on it.

3. The packaged set according to claim 1, further comprising a plug.

4. The packaged set according to claim 1, further comprising an inverter set.

5. The packaged set according to claim 1, wherein the disk lamination of the luminous disk is a blank disk lamination made of plastic.

6. A method for making use of the packaged set as claim in claim 1, comprising the following steps:
    (a) printing desired patterns on a blank sheet of transparent sticker with cutting lines on it, which is provided by the packaged set of a luminous disk;
    (b) detaching the patterned sticker from the sheet along the cutting lines; and
    (c) plastering a luminous surface of the luminous disk with the patterned sticker.

7. The method according to claim 4, wherein the pattern further comprises pre-defined symbols.

8. The method according to claim 4, wherein the luminous disk can be of any different shape.

* * * * *